United States Patent
Bagnulo

[15] 3,686,747
[45] Aug. 29, 1972

[54] ELECTRICALLY INSULATING PIPE UNION

[72] Inventor: Luigi Bagnulo, Via A. Volta, 18, Milan, Italy

[22] Filed: Dec. 18, 1969

[21] Appl. No.: 886,104

[30] Foreign Application Priority Data
Dec. 21, 1968 Italy.................849618 A/68

[52] U.S. Cl. ......................29/508, 29/516, 285/53, 285/334.4, 285/371, 285/382, 285/DIG. 16
[51] Int. Cl. ....................B21d 39/00, B23p 11/02
[58] Field of Search.......285/236, 398, 371, DIG. 16, 285/55, 382, 382.1, 382.2, 256, 47–54, 334.5, 234, 53; 29/237, 508, 516

[56] References Cited

UNITED STATES PATENTS

| | | | |
|---|---|---|---|
| 1,035,212 | 8/1912 | McCarthy | 285/53 X |
| 2,349,016 | 5/1944 | Stephens | 285/234 |
| 3,503,632 | 3/1970 | Braun | 285/334.5 X |
| 407,037 | 7/1889 | Robertson | 285/382.2 |
| 1,921,642 | 8/1933 | Stephenson | 285/334.5 |
| 2,273,154 | 2/1942 | Stromsoe | 285/55 |
| 2,741,498 | 4/1956 | Elliott | 285/382.2 X |
| 2,950,930 | 8/1960 | Dunmire | 285/236 X |

FOREIGN PATENTS OR APPLICATIONS

| | | | |
|---|---|---|---|
| 681,827 | 5/1966 | Belgium | 285/334.5 |
| 580,775 | 7/1933 | Germany | 285/371 |
| 842,233 | 7/1960 | Great Britain | 285/48 |

*Primary Examiner*—Thomas F. Callaghan
*Attorney*—Michael S. Striker

[57] ABSTRACT

A pair of tubular metallic pipes having adjacent axially aligned outwardly flared end portions accommodated in axially spaced annular portions of a first deformable shape-retaining sleeve with a second deformable shape-retaining outer sleeve tightly surround the inner sleeve to thereby form a hermetically sealed interconnecting assembly for the respective pipes.

3 Claims, 6 Drawing Figures

3,686,747

Patented Aug 29 1972

INVENTOR

BY

ATTORNEY

– 2 –

ELECTRICALLY INSULATING PIPE UNION

BACKGROUND OF THE INVENTION

The present invention relates to pipe unions and a method of manufacturing the same and which are electrically insulating and are utilized to interconnect the respective discrete sections of a pipe and/or interrupt the metallic continuity of the same so as to thereby avoid circulation of electric currents and consequent occurrence of corrosion.

Pipe unions are known which essentially are constituted by a first tubular member having a socket, a second tubular member having an end flange, a first sealing ring of a flexible and electrically insulating material inserted between the socket of the first tubular member and the flange of the second tubular member, a second insulating ring inserted between the back portion of the second tubular member and the head of a third locking ring which is screwed or welded to the inner wall of the socket of the first tubular member and a filling of an electrically insulating material between the inner surface of the locking ring and the outer surface of the second tubular member.

Also known is the application of a layer of electrically insulating paint which is coated on the inner surfaces of the two interconnected or joint tubular members in the region of the joint line thereof and which extends along a certain length on either side of this line, thus avoiding the formation of electric arcs chiefly in the case of piping used for liquid substances which are more or less conductive.

Such joints, however, necessitate long and complicated processing not only as regards the preparation of the discrete components but moreover as regards the assembly thereof and the cost of which is very high, especially in the case of joints or unions for use with pipings which have a small diameter.

SUMMARY OF THE INVENTION

The object of the present invention is to provide an insulating joint which does not require excessive mechanical work as regards its manufacture and which is easy to assemble and which, nevertheless, has an excellent electrical insulation efficiency and forms a positive seal and resistance to torsional-tensile-and bending stresses.

A further object of the present invention is to provide a method of manufacturing such a joint and which comprises the steps of forming a first and second tubular member having at least one of their respective end portions conically flared;

forming a connecting joint from a deformable electrically insulating sealing material for interconnecting the first and second tubular members at their respective conically flared end portions thereof, with the connecting joint being formed with annular portions at axially opposite ends thereof and with each of these portions provided with an inner and an outer surface, and a jacket member surrounding the outer surface;

introducing the conically flared end portions axially spaced from each other into the connecting joint and into engagement with the inner surfaces such that the flared end portions extend at an inclined angle with the inner surfaces; and applying radially inwardly directed pressure onto the jacket means to thereby deflect the connecting joint into sealing engagement with the conically flared end portions and to reduce the angle of inclination between the respective end portions and the inner surfaces.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
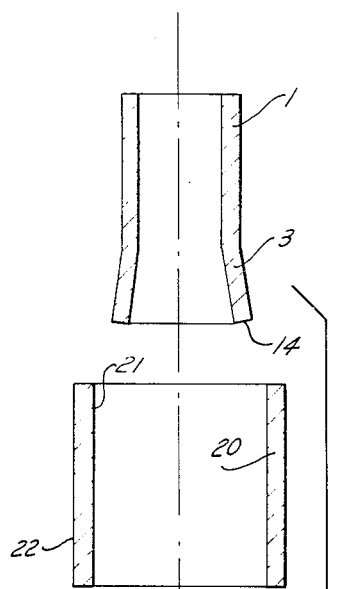
FIG. 1 shows an exploded cross-sectional view of the individual parts constituting the insulating joint according to the present invention.
Figure 2:
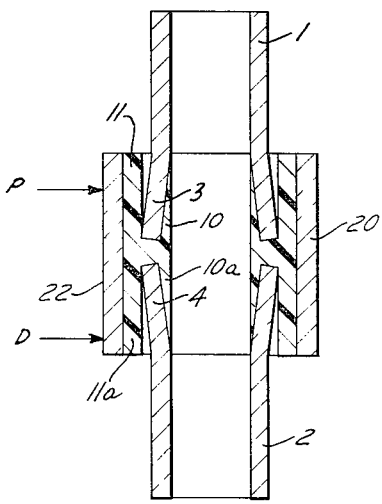
FIG. 2 in cross-sectional view shows the respective parts of FIG. 1, however in assembled but not sealed condition.
Figure 3:
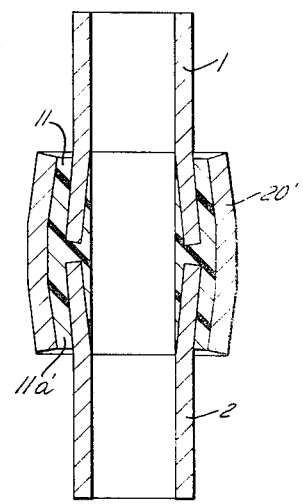
FIG. 3 shows in cross-sectional view the arrangement of FIG. 2, but in assembled and sealed or final condition.

Referring now to the drawings in which like reference numerals index like parts, the arrangement shown in FIGS. 1, 2 and 3 is seen to comprise two metallic tubular members 1 and 2 having one of their respective end portions 3, 4 flared conically outwardly and arranged coaxially opposite relative to each other.

A substantially cylindrical inner sleeve 5, made of an electrically insulating material which is sufficiently rigid yet deformable and, preferably, is selected from the group of synthetic resin with fiberglass, asbestos with nylon, or the like, is seen to have an axially extending bore 6, a center core 7, and two axially spaced annular recesses 8, 9 which extend axially outwardly from the center core 7 in concentric relation with the bore 6. The sleeve 5 is seen to comprise inner flange portions 10, 10a and outer flange portions 11, 11a defined respectively, at the one hand, between the recesses 8, 9 and the peripheral surface 12 of the bore 6 and, on the other hand, between the recesses 8, 9 and the outer surface 13 of the sleeve 5.

Figures 5, 6:
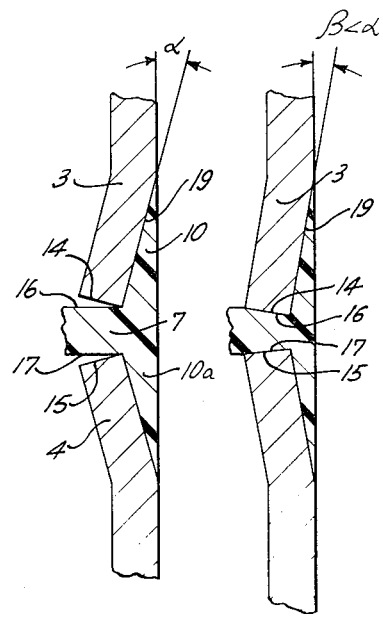
FIGS. 5 and 6, in detail, illustrate the mid-section of the insulating joint shown in FIGS. 1, 2 and 3, and the respective flared end portions of the tubular members, both before and after the sealing step of the respective flared end portions with the joint.

The respective recesses 8, 9 are coated with a layer L of a resin binding material, and accommodate the opposite flared end portions 3, 4 in spaced apart relationship and with the faces 14, 15 of the latter respectively abutting against the inner end faces 16, 17 of the recesses 8, 9 and with the inner peripheral surfaces 18 of the end portions 3, 4 engaging the slightly slanting walls 19 of the recesses 8, 9 and extending therewith at an angle of inclination α, FIG. 5. The flanges 10, 10a preferably are conical, as shown, so as to facilitate insertion of the respective ends 3, 4 into their respective recesses and to effect a more positive adhesion of the former to the respective walls of the recesses.

The second substantially cylindrical outer sleeve 20, made of metal, surrounds the inner sleeve 5 with the inner surface 21 of the sleeve 20 in mating contact with the outer surface 13 of the sleeve 5. The ends 3, 4 of the tubular members 1, 2 are sealed into their respective positions shown in FIG. 3, by applying radially inwardly directed pressure P onto the outer surface 22 of the sleeve 20, as illustrated in FIG. 2. This pressure, which should be sufficiently strong, causes the flanges 11, 11a to be tightly compressed against the flared end portions 3, 4 which, in turn, are firmly pressed against the inner flanges 10, 10a whereby a positive sealing assembly is obtained between the respective joint components and the end portions 3, 4. In this condition, the angle of inclination α of the end portions 3, 4 and the walls 19 of the recesses 8, 9 is reduced to a relationship of $\beta < \alpha$, as illustrated in FIGS. 5 and 6, and the sealing assembly thus obtained has taken the form of two opposed truncated cones or, expressed in a more popular term, the sealing assembly in this condition is barrel-shaped.

It will be appreciated that compression onto the jacket 20 effects not only the clamping of the flanges 11, 11a and thereby compression of the end portions 3, 4 but, moreover, effects the positive seal between the surfaces 14, 15 and 16, 17 of the end portions 3, 4 and the recesses 8, 9, respectively.

Figure 4:
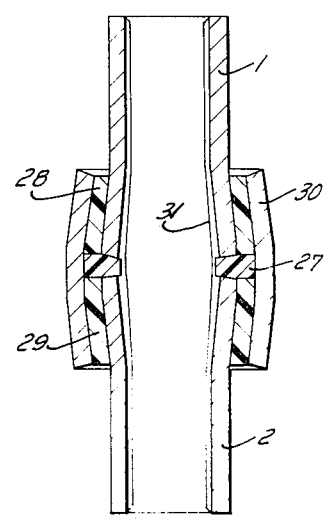
FIG. 4 shows a further embodiment of the insulating joint of FIG. 3, however with a lining of insulating paint on the inside of the tubular members and the joint instead of the inner flange portions incorporated in the joint arrangement of FIG. 3.

As shown in the embodiment of FIG. 4, the respective parts which constitute the insulating joint, may consist of individual parts, for example, a central core 27, flanges 28 and 29, an outer jacket 30, and in addition, an insulating lining 31 coated on the inner surfaces of the tubular members 1 and 2 in overlapping relationship with the region of the insulating joint. The insulating lining 31, in this instance, is obtained by applying a coating of a resin or paint or any other suitable insulating material, to the respective surfaces.

Contrary to the manufacturing of the already known insulating joints, the mechanical work necessary for the construction of the hereinbefore described insulating joint according to the present invention, only involves drawing and flaring of the end portions 3, 4 of the tubular members 1, 2 and subsequent compression of the metallic sleeve 20, the flanges 11, 11a and the end portions 3, 4 in order to constitute tightening of the entire assembly. Such an arrangement is especially advantageous during laying of a pipe system, and which avoids the necessity of conventional prefabricated insulating joints.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. A method of manufacturing a pipe union comprising the steps of forming at the ends of two pipes frustoconical outwardly flared end portions having a predetermined conicity, said ends of said frustoconical type end portions having end faces spaced from each other a predetermined distance; placing about said frustoconical outwardly flaring pipe end portions a deformable insulating means including an annular central core portion having a width substantially equal to the distance between said end faces and located between the same, spaced at least partly from the same, and projecting outwardly therefrom, and two flange portions located outwardly of said flaring pipe end portions and having a conicity smaller than the conicity of said flaring pipe end portions; surrounding said insulating means with a tubular substantially cylindrical integral retaining member including opposite end portions; and applying at least to said end portions of said tubular retaining member radially inwardly directed pressure of such magnitude so as to compress and deform the same, the flange portions of said insulating means and said flaring pipe end portions to reduce the conicity of the latter whereby the end faces of said pipe end portions are moved into compressing contact with said core portion and said flanges of said insulating means are firmly pressed against said flaring pipe end portions firmly connecting the same to each other while air-tightly sealing the space between the end faces thereof and electrically insulating them from each other.

2. A method as defined in claim 1, wherein said deformable insulating means is made of an electrically insulating sealing material.

3. A method as defined in claim 1, wherein said deformable insulating means is made of a plastic material reinforced with asbestos.

* * * * *